(12) United States Patent
Sakata et al.

(10) Patent No.: US 6,201,644 B1
(45) Date of Patent: Mar. 13, 2001

(54) LIGHT DEFLECTION DEVICE AND ARRAY THEREOF

(75) Inventors: Hajime Sakata, Atsugi; Takayuki Yagi, Yokohama, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/190,098

(22) Filed: Nov. 12, 1998

(30) Foreign Application Priority Data

Nov. 15, 1997 (JP) ..................................................... 9-331324

(51) Int. Cl.[7] .............................. G02B 27/10; G02B 7/02
(52) U.S. Cl. ............................................. 359/618; 359/823
(58) Field of Search ..................................... 359/618, 619, 359/627, 819, 823; 385/14, 18, 25

(56) References Cited

U.S. PATENT DOCUMENTS

| 4,436,260 | 3/1984 | Donelan ............................. 244/3.16 |
| 4,883,548 | * 11/1989 | Onoki ..................................... 156/99 |
| 4,961,627 | 10/1990 | Swain et al. ........................... 350/319 |
| 5,600,741 | * 2/1997 | Hauer et al. ........................... 385/35 |

FOREIGN PATENT DOCUMENTS

| 2530831 | 1/1984 | (FR) . |
| 4-230722 | * 8/1992 | (JP) ............................... G02B/26/08 |
| 7-333528 | * 12/1995 | (JP) ............................... G02B/26/08 |
| WO87/07707 | 12/1987 | (WO) . |

* cited by examiner

*Primary Examiner*—Georgia Epps
*Assistant Examiner*—Saeed Seyrafi
(74) *Attorney, Agent, or Firm*—Fitzpatrick, Cella, Harper & Scinto

(57) ABSTRACT

A light deflection device comprises a segmental sphere body having a deflection face portion for deflecting and transmitting an incident light beam, and a segmental sphere face portion opposing to the deflection face portion, a base plate for supporting the segmental sphere body in a turnable manner, and a driving means for turning the segmental sphere body, the refractive index of the segmental sphere body being different from the refractive index of a space or medium brought into contact with the deflection face portion. A light deflection device array coomprises the light deflection devices arranged in a one-dimensional or two-dimensional array.

17 Claims, 6 Drawing Sheets

LIGHT DEFLECTION DEVICE AND ARRAY THEREOF

BACKGROUND OF THE INVENTION

1. Field of the Invention

The present invention relates to a light deflection device for interconnection by light wave between arbitrary spots, and other uses. Particularly, the present invention relates to a light deflection device suitable for optical information processing such as optical interconnection or optical wiring between elements in an integrated circuit, within or between apparatuses; optical switching for switch-over of transmitted optical data; and optical information processing such as optical neutral networks.

2. Related Background Art

Holograms, liquid crystal switch arrays, and the like have been studied as the light deflection device for optical interconnection for programmable circuit connection. However, in computer generated hologram, in which the diffraction direction is fixed, the hologram should be replaced according to change of a connection route, and it is applicable only to a limited transmission type or a limited processing. A hologram capable of varying the diffraction direction can be constituted by an optical writing type of spatial light modulator, but it requires interference exposure of a liquid crystal or an optical crystal, and complicates construction of the apparatus. Besides, two-directional liquid crystal switch array are applicable therefor, but it requires multiple or repeated switching, complicating the apparatus, and its switching speed is lower owing to the liquid crystal properties.

Differently from the above optical deflection mechanism employing light diffraction or refractivity change, techniques are disclosed which control the light deflection by tilting a mirror according to micromechanics. For example, Japanese Patent Application Laid-Open No. 4-230722 deflects the reflection direction of incident light by attracting electrostatically a thin metal plate; and Japanese Patent Application Laid-Open No. 7-333528, by turning a hemisphere having a mirror. Such techniques, which utilize light reflection, require an arrangement not to cause overlapping of the introduced light beam and the reflected light beam, resulting in a larger a size of the device construction.

SUMMARY OF THE INVENTION

An object of the present invention is to provide a light deflection device capable of response at a higher speed with a smaller apparatus without the disadvantages of the prior arts.

The light deflection device of the present invention comprises a segmental sphere body having a deflection face portion for deflecting and transmitting an incident light beam and a segmental sphere face portion opposing to the deflecting face portion; a base plate for supporting the segmental sphere body in a turnable manner; and a driving means for turning the segmental sphere body, the refractive index of the segmental sphere body being different from the refractive index of a space or medium brought into contact with the deflection face portion.

In the above light deflection device, the deflection face portion of the segmental sphere body is preferably placed inside an imaginary perfect spherical body which has the above segmental sphere face as a part of the entire spherical face, and gives the segmental sphere body by cutting off a part of the perfect sphere body.

The light deflection device of the present invention is characterized in that the incident light beam is deflected in a direction of the light transmission to offset the disadvantage of the prior arts. It is also characterized in that a micromechanics is applied to the deflection control mechanism to control the deflection directions of the respective deflection elements arranged in an array, independently from each other and to make the apparatus smaller. The light deflection device of the present invention comprises a segmental sphere body having a deflection face portion for deflecting and transmitting an incident light beam and a segmental sphere face portion opposing to the deflection face portion to envelop the deflection face portion; a base plate for supporting the segmental sphere body in a turnable manner; and a driving means for turning the segmental sphere body. The segmental sphere body is comprised of a constituting material which is capable of transmitting the light beam to be deflected. The refractive index of the segmental sphere body is different from the refractive index of a space or medium brought into contact with the deflection face portion. The segmental sphere body is preferably solid.

DESCRIPTION OF THE PREFERRED EMBODIMENTS

Figure 10A:
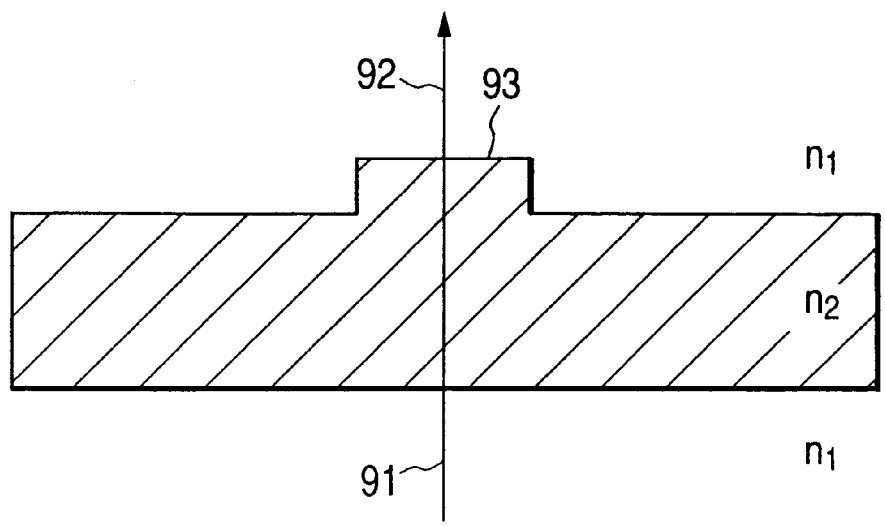
FIG. 10A and FIG. 10B are schematic views for explaining the principle of deflection in the light deflection device of the present invention.
Figure 10B:
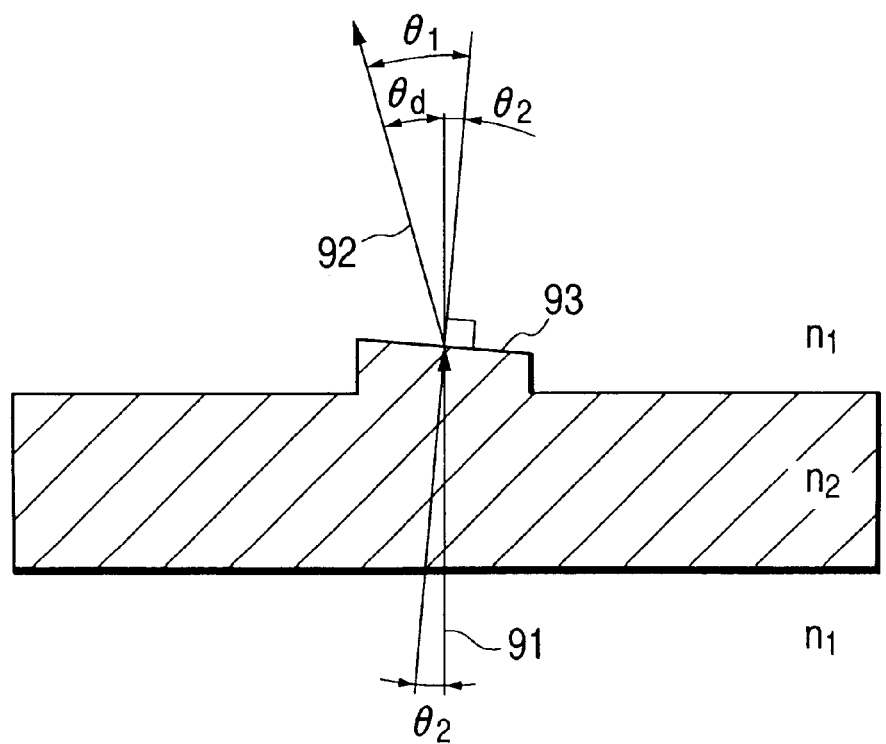

The present invention utilizes light refraction at interface 93 between two mediums having refractive indexes different from each other as shown in FIG. 10A and FIG. 10B. With interface 93 not tilted as shown in FIG. 10A, incident light beam 91 passes through without deflection.

Figure 1:
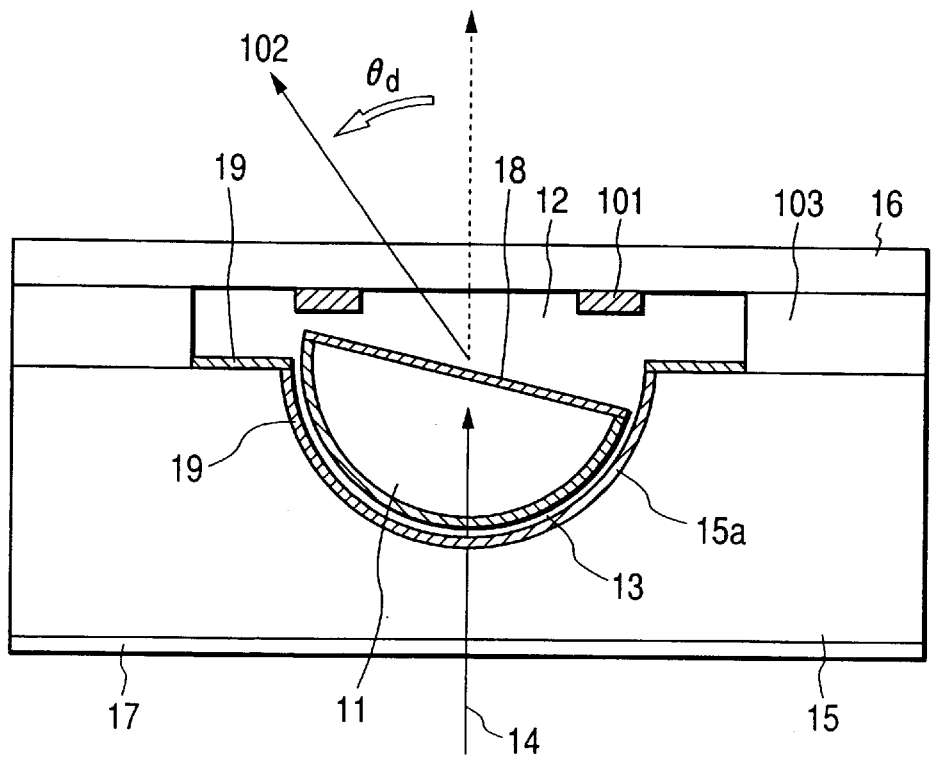
FIG. 1 is a schematic sectional view of a first example of the light deflection device of the present invention.

In the present invention, as shown in FIG. 10B, the interface between the two mediums having different refractive indexes ($n_1$ and $n_2$ in the drawing) is tilted relative to incident light 91 in a three-dimensional space to control the direction of refraction of transmitted light beam 92. In practicing this principle, the controlling interface 93 only should be tilted without influence of other interface on the light transmitted through the entire device. A specific practicable means is shown in FIG. 1, which utilizes the difference between refractive indexes of controllably turnable hemisphere 11 and medium 12 in contact with the deflection face portion of the hemisphere. The interface for changing the tilting angle, opposite to the deflection face portion, is in a spherical shape, and the contact interface between receiving base plate 15 and hemisphere body 11 is designed so as not to cause the refraction to be generated by mechanism of controlling the turn movement. For this purpose, a measure is taken, for example, such that optical matching oil 13 having the same refractive index as the hemisphere body and base plate 15 is filled into the gap, or, if it is not practicable, the surfaces of hemisphere body 11 and receiving portion 15a are treated for antireflection and additionally a suitable matching oil is filled to the gap.

To decrease reflection loss of the light 14 to be deflected at the interfaces during the passage through the device and to prevent stray light, reflection prevention treatment is conducted not only at the aforementioned face for tilting angle change of hemisphere body 11 but also at supporting base plate 15 for supporting the segmental sphere body, the segmental sphere face of the segmental sphere body, turn-driving electrode 101, and support 16 thereof, or a window is opened therefor, as necessary.

Another specific embodiment below is also applicable. A base plate is comprised to support a segmental sphere body so as to be turnable freely around the center of a perfect sphere for the segmental sphere body, whereby the light beam deflection is controlled readily and precisely. The segmental sphere body may be supported as below. The base plate has a concave formed to support the segmental sphere body so as to be turnable. For supporting the segmental sphere body so as to be turnable smoothly and controllably, a lubricating material for reducing the reflection of the light to be deflected is filled into the gap between the segmental sphere body and the concave on the base plate. For the same purpose, the concave on the base plate is preferably in a shape corresponding to the shape of the segmental sphere body (in a shape of a segmental sphere like a hemisphere). Thereby, the force which is applied to the segmental sphere body in a direction toward the center of the segmental sphere body is caught by the concave to prevent displacement of the segmental sphere body to the force direction to ensure the turning movement of the segmental sphere body. The shape of the concave is not limited thereto, and may be in a shape of a cone, a cylinder, or the like.

The deflection face portion is typically in a shape of a flat plane. If necessary, the deflection face portion may be concave or convex. However, deflection control is easier with a flat face. The segmental sphere portion is typically in a shape of a hemisphere, so that the segmental sphere body comprised of the hemisphere portion can readily be supported in a turnable manner, and be relatively readily prepared.

The aforementioned driving means is constituted as follows.

In an embodiment, the driving means comprises an electrode provided on a segmental sphere body, and a separate driving electrode opposing thereto. The segmental sphere body is turned by electrostatic force generated by voltage application between the electrode on the segmental sphere body and the separate driving electrode.

In another embodiment, the driving means comprises a charge distribution formed on the surface of a segmental sphere portion of a segmental sphere body, and a driving electrode for generating an electric field around the segmental sphere portion. In this embodiment, the gap between the base plate and the segmental sphere body is filled with a dielectric liquid, and the regions of different charging characteristics are charged with a different polarity of electric charge. The segmental sphere body is turned by electrostatic force generated between the regions and the electrode provided on the base plate side. This constitution is simpler since the segmental sphere body need not be connected to electric wiring. Furthermore, since the electrode is provided on the base plate side, the electrode will not come into contact with the segmental sphere body, and the segmental sphere body can be turned with a higher rotation freedom in comparison with the embodiment having an electrode on the upper opposing side.

In a still another embodiment, the driving means for turning the segmental sphere body may be comprised of a magnetic body (e.g., a magnetic film) formed on a portion of the segmental sphere body and an electromagnet opposing thereto. In this constitution, the segmental sphere body is turned by the magnetic force generated between the magnetic film and the electromagnet. The electromagnet, when provided on the base plate side, gives the advantages that the electromagnet will not come into contact with the segmental sphere body, differently from the embodiment having an electrode on the upper opposing side, and the turning torque-applied point is always at the radius of the segmental sphere body without variation of the distance between the torque application point and the center of turning, resulting in improved controllability of the turning direction and the turning angle.

Otherwise, the driving means for turning the segmental sphere body is comprised of a control mechanism comprising electrodes arranged appropriately on two orthogonal planes containing the spherical center of the segmental sphere body to cause the turning.

An array of light deflection devices can be simply constructed, in which plurality of the above light deflection devices a plurality of the segmental sphere bodies and driving means are arranged in a one-dimensional or two-dimensional array.

EXAMPLE 1

FIG. 1 is a sectional side view of the device of a first example of the present invention. Si base plate 15 has hemispherical concave 15a. The bottom face of Si base plate 15 is coated with antireflection film 17 comprised of a multi-layer of $TiO_2$ and $SiO_2$. Hemisphere body 11 of Si, which is made of the same material as base plate 15 and has nearly the same radius as concave 15a, is fitted into concave 15a. The entire surface of Si hemisphere body 11 is coated with transparent electrode 18 comprised of an ITO film. ITO film 18, which has a refractive index of about 1.9, exhibits antireflection effect at a quarter wavelength thickness on Si having a refraction index of 3.7. The top face of Si base plate 15 including concave 15a is coated with the same transparent electrode film (19). The gap between hemisphere body 11 and concave 15a of the supporting base plate 15 is filled with optical matching oil 13 to prevent light reflection on the surface of hemisphere body and the concave or through transparent electrode films 18, 19. This matching oil is transparent at the wavelength of transmitted light beam, and has a refractive index roughly matched with the refractive index of hemisphere body 11 and base plate 15 thereof. Optical matching oil 13 serves simultaneously for lubrication and electric contact between transparent electrode films 18 and 19 of hemisphere body 11 and concave 15a to fix the potential of ITO film 18 on the hemisphere body surface through electrode 19 of Si supporting base plate 15.

Figure 2:
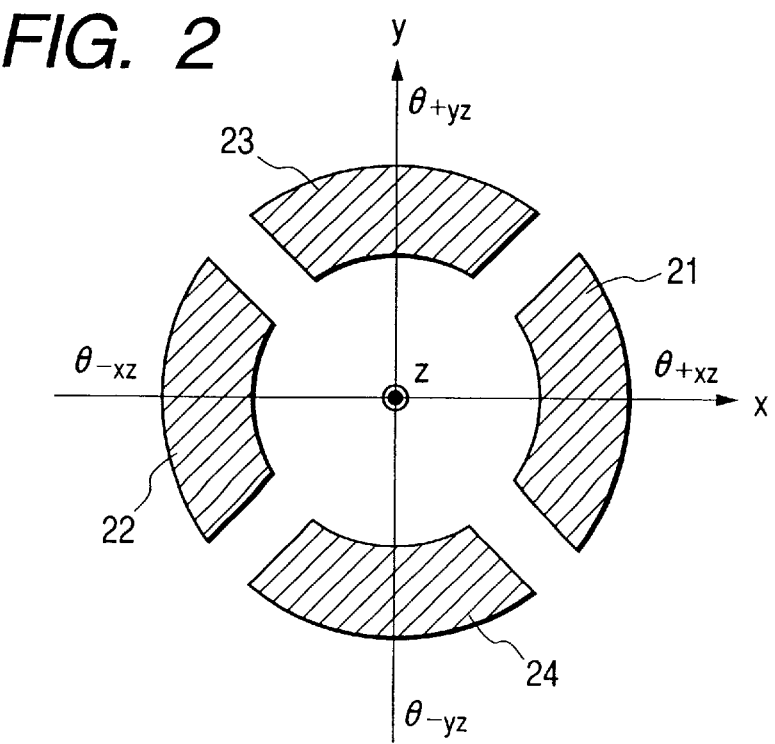
FIG. 2 shows an example of arrangement of driving electrodes in the light deflection device of the present invention.
Figure 3:
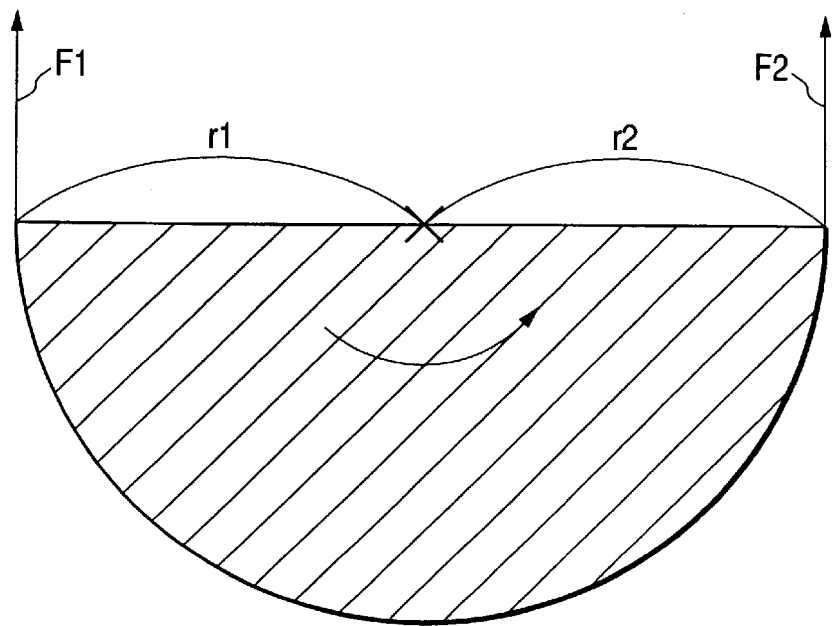
FIG. 3 shows schematically the principle of turning the segmental sphere body in the present invention.

Above Si base plate 15, quartz base plate 16 in a shape of a plane parallel plate is placed with interposition of spacer 103 so as not to impede the turning movement of hemisphere body 11. There, four-divisional Au drive electrodes 101 are provided above hemisphere body 11 to exert electrostatic force to hemisphere body 11. FIG. 2 is a plan view of four-divisional electrodes 21 to 24. Two electrodes 21, 22 opposing to each other on the x axis on quartz base plate 16 control the turning of hemisphere body 11 in x-z plane (along the plane direction of the paper sheet of FIG. 1) by balance of the voltage applied to two electrodes 21, 22. The two electrodes 23, 24 opposing to each other on the y axis on quartz base plate 16 control the turning of hemisphere body 11 in y-z plane direction (in the direction perpendicular to the paper sheet of FIG. 1) by balance of the voltage applied to two electrodes 23, 24. As shown in FIG. 3, hemisphere body 11 turned by the torque (F1×r1) is stopped at the desired position by application of the same torque (F2×r2) as above in the reverse direction. After the turning around the respective turning axis, the torques are controlled to result in a synthesized torque of zero at the flat portion of hemisphere body 11 to stop the turning. In such a manner the turning in the two orthogonal planes are controlled to tilt hemisphere body 11 in a desired direction.

The central area surrounded by divisional electrodes 21 through 24 on quartz base plate 16 constitutes a transmission window for deflected light 102. Base plate 16 in a shape of plane parallel to the base plate is transparent, and is coated with an antireflection film comprised of a multi-layer of $MgF_2/SiO_2$ (not shown in the drawing). Light 14 introduced directly below Si base plate 15 holding hemispherical sphere 11 travels through transparent electrode film 19, and the solid portion of hemisphere body 11 having the same refractive index as base plate 15 to the flat portion of hemisphere body 11 (incident light 14 is allowed to travel surely straight by selecting the refractive indexes of the materials as above), and is transmitted and deflected depending on the tilting of the flat portion. The transmitted light beam 102 is emitted from the transmission window of upper quartz base plate 16. Since the front side and the back side of base plate 16 in a plane-parallel plate shape are in contact with air, transmitted light 102 displaces slightly in parallel at base plate 16 without causing no problem in control of the deflection. Confronting Si base plate 15 and quartz base plate 16 are supported by spacer 103 such that electrodes 101 and 18 do not come into contact with each other.

The resulting light deflection angle $\theta_d$ is derived from Snell's Law as a function of the tilting angle $\theta_2$ as below, as shown in FIG. 10B:

$$\theta_d = \theta_1 - \theta_2 \quad (1)$$

$$\theta_1 = \sin^{-1}[(n_2 \sin\theta_2)/n_1] \quad (2)$$

For example, with Si having a refraction index of 3.7 ($n_2$) at wavelength of 1.3 µm, and air having refraction index $n_1$ of approximately 1, hemisphere body 11 tilted by 10° deflects the outgoing light beam by a deflection angle $\theta_d$ of approximately 30°. In this Example, the light beam is introduced from base plate 15. However, the direction may be reversed to introduce the light beam from quartz base plate 16 in a plane parallel plate shape.

EXAMPLE 2

Figure 4:
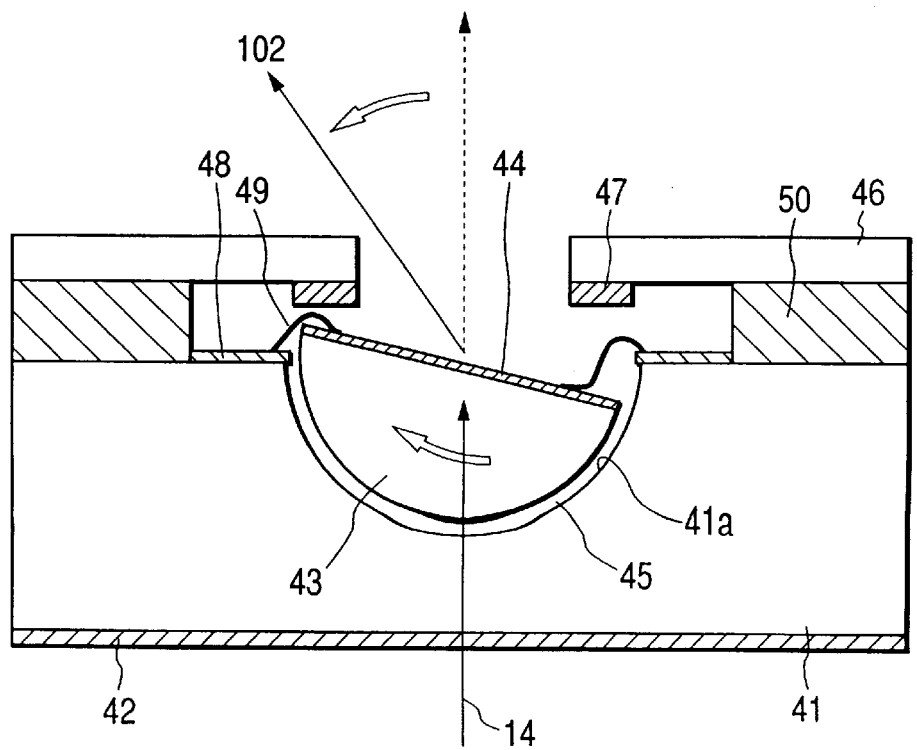
FIG. 4 is a schematic sectional view of a second example of the light deflection device of the present invention.

FIG. 4 is a sectional side view of the device of a second example of the present invention. The bottom face of quartz base plate 41 having hemispherical concave 41a is coated with antireflection film 42 comprised of a multi-layer of $MgF_2$ and $SiO_2$. Hemisphere body 43 of quartz having nearly the same radius as concave 41a is fitted into concave 41a. Quartz base plate 41 having hemispherical concave 41a is obtained by isotropic etching of quartz base plate 41 through a circular hole of a Cr—Au mask with an aqueous hydrofluoric acid solution. The flat portion of hemisphere body 43 is coated with transparent electrode 44 comprised of an ITO film. The gap between hemisphere body 43 and concave 41a of base plate 41 is filled with optical matching oil 45 having the same refractive index as quartz. Therefore, no antireflection film is provided on the spherical surface of hemisphere body 43 and the surface of hemispherical concave 41a.

Quartz base plate 46 is placed above hemisphere body 43 with interposition of spacer 50. On the lower face of quartz base plate 46 above hemisphere body 43, four-divisional electrodes 47 are provided to exert electrostatic force to transparent electrode 44 formed on hemisphere body 43. Transparent electrode 44 on the flat face of the hemisphere body is brought into contact with electrode brush 49 extended from electrode 48 formed on base plate 41 to fix the potential of transparent electrode 44. Quartz base plate 46 at the light emitting side may be coated with antireflection film at the region surrounded by electrodes 47, or may be bored at that region of quartz base plate 46 to form a transmission window as shown in the drawing.

Example 2 is different from Example 1 in the method of fixation of the potential of the transparent electrode of the hemisphere body. However, the tilt of hemisphere body 43 is controlled as desired by voltage application to the four confronting electrodes in the same manner as in Example 1.

EXAMPLE 3

Figure 5:
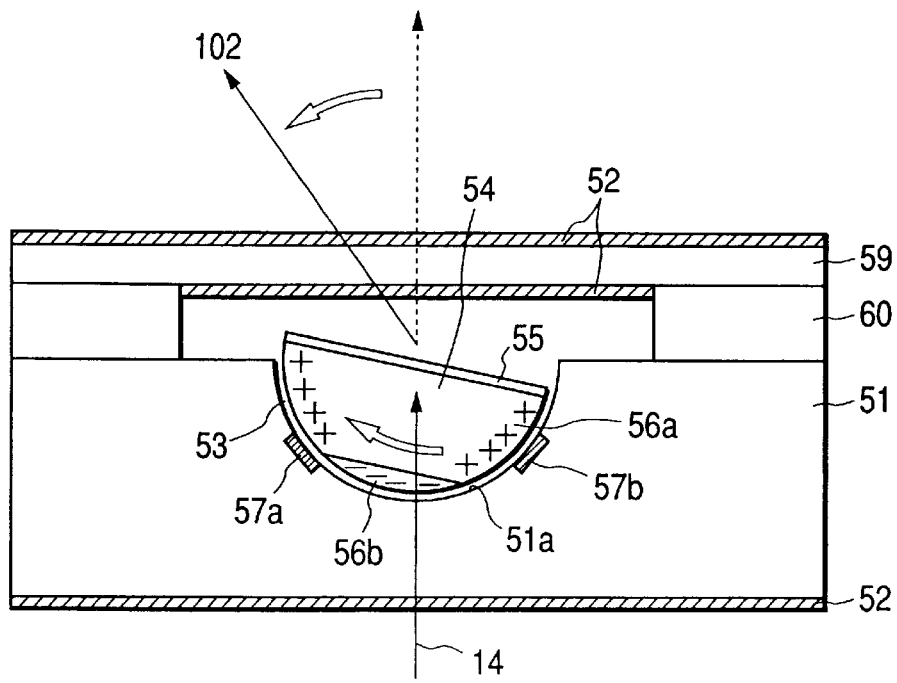
FIG. 5 is a schematic sectional view of a third example of the light deflection device of the present invention.

FIG. 5 shows a third example of the present invention. The bottom face of quartz base plate 51 having hemispherical concave 51a is coated with antireflection film 52 comprised of a multi-layer of $MgF_2$ and $SiO_2$. Concave 51a is filled with transparent dielectric liquid 53, and therein quartz hemisphere body is fitted. The flat face portion of hemisphere body 54 is also coated with antireflection film 55.

Hemisphere body 54 is prepared from a micro-bead of quartz of 100 µm diameter by cutting a portion thereof by polishing to form a flat face. Then the flat face of this hemisphere body 54 is fixed on an adhesive tape. Onto the spherical face of the hemisphere body, $MgF_2$ is vacuum-deposited by sputtering to form a chargeable region 56a (for positive charging). A photoresist is applied on the surface of the hemisphere body. A portion of the photoresist is developed by light exposure, and the $MgF_2$ at the portion is removed by ion etching to bare the quartz glass partially to form chargeable region 56b (for negative charging). Thus regions 56a, 56b of different charging characteristics are formed on the spherical surface. In the case where the chargeable film is formed on the portion of the hemisphere body 54 corresponding to the path of the light beam to be deflected, the film should naturally be formed from a material transparent to the light beam 14 to be deflected. Above hemisphere body 54, transparent cover 59 coated with antireflection films 52 is placed with interposition of spacer 60.

The particle (hemisphere body 54 in this Example) in the dielectric liquid exchanges electric charges with the liquid to form an electric double layer to be charged positively or negatively. In this Example, formed chargeable regions 56a and 56b having different charging characteristics cause uneven distribution of the positive and negative charges between the regions, whereby hemisphere body 54 has an electric moment. Therefore, application of a potential to electrodes 57a, 57b exerts a torque to hemisphere body 54 to turn the pole direction in accordance with the direction of the electric field produced by electrodes 57a, 57b.

For example, on application of a positive voltage to driving electrode 57a and a negative voltage to the other electrode, charged region 56b turns to equilibrate its electric pole direction to driving electrode 57a. On application of a positive voltage to driving electrode 57b and a negative voltage to the other electrode, charged region 56b moves to equilibrate the charge pole direction to driving electrode 57b. The torque is offset when hemisphere body 54 has turned to equilibrate the vector of the electrical moment of hemisphere body 54 to the electric field direction. After the turn has completed, hemisphere body 54 is kept at that position unchanged owing to a frictional force of concave 51a without application of voltage. Further, when the electric field is applied again in a different direction, a torque is produced to equilibrate the electrical moment to the electric field to turn hemisphere body 54. In this Example, the potential of hemisphere body 54 need not be fixed from the outside. Therefore this embodiment is advantageous in simplicity of the entire apparatus. The arrangement of driving electrodes 57a, 57b may be the same as in FIG. 2, but is not limited thereto, and may be selected suitably.

In another embodiment, a magnetic film is formed on the hemisphere body in place of the chargeable film. Thereby the same effects as above can be achieved. In this embodiment, the electromagnets may be provided at plural positions on the receiving concave 51a of hemisphere body-supporting base plate 51 or on the bottom of supporting base plate 51. Hemisphere body 54 is turned to change the direction by controlling the magnetic force between the magnetic films and the electromagnets by adjusting the quantity of the electric current or current supplying time to be applied to the electromagnets.

EXAMPLE 4

Figure 6:
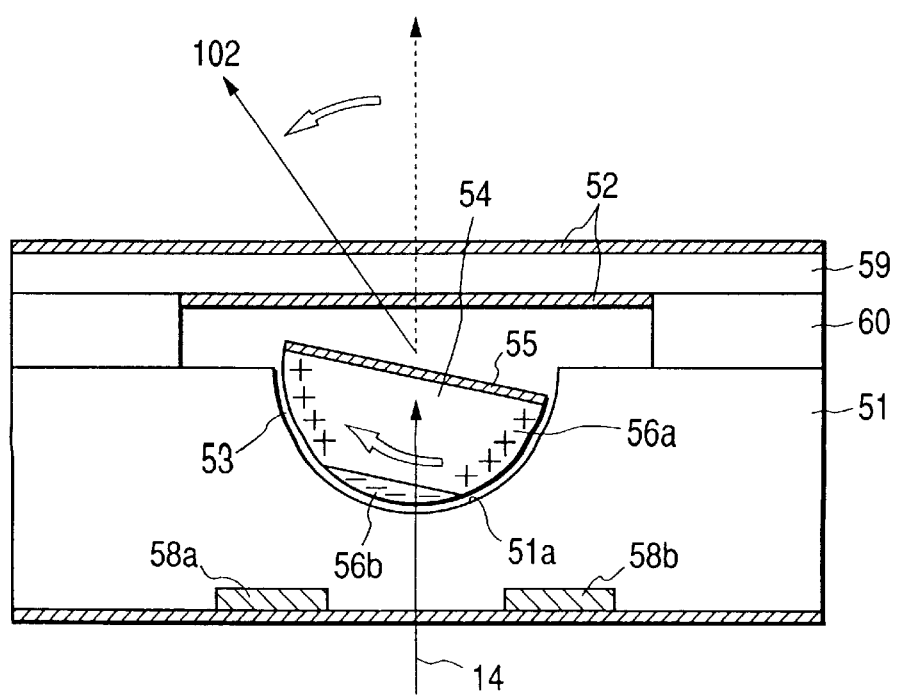
FIG. 6 is a schematic sectional view of a fourth example of the light deflection device of the present invention.

FIG. 6 shows a fourth example of the light deflection apparatus of the present invention. In FIG. 6 the same members as in FIG. 5 are indicated by the same reference numbers without explanation.

This example is different from Example 3 in that electrodes 58a and 58b are formed on the bottom face of quarts base plate 51 in place of electrodes 57a and 57b in FIG. 5, and quartz hemisphere body 54 is driven by electrodes 58a and 58b. The device of this Example is capable of driving arbitrarily the hemisphere body in the same manner as in Example 3.

EXAMPLE 5

Figure 7:
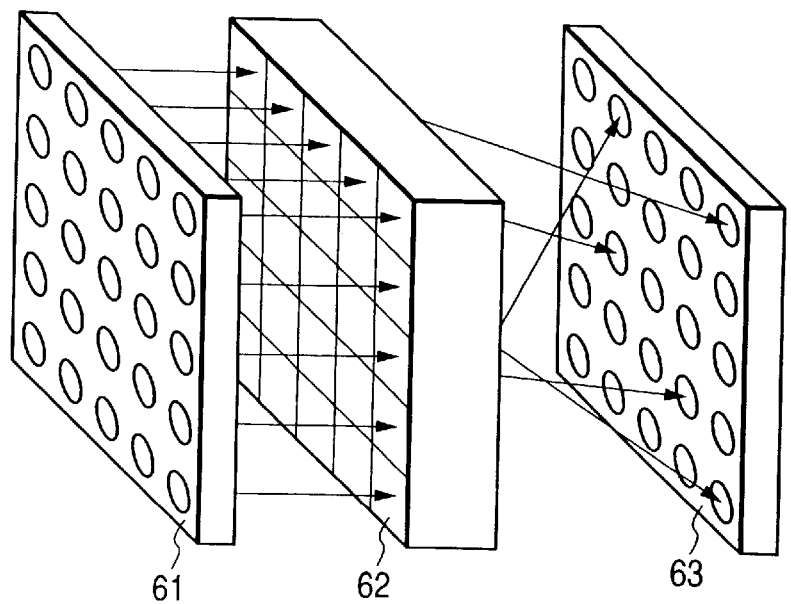
FIG. 7 and FIG. 8 are perspective views of an array of the light deflection device in a fifth example of the present invention.
Figure 8:
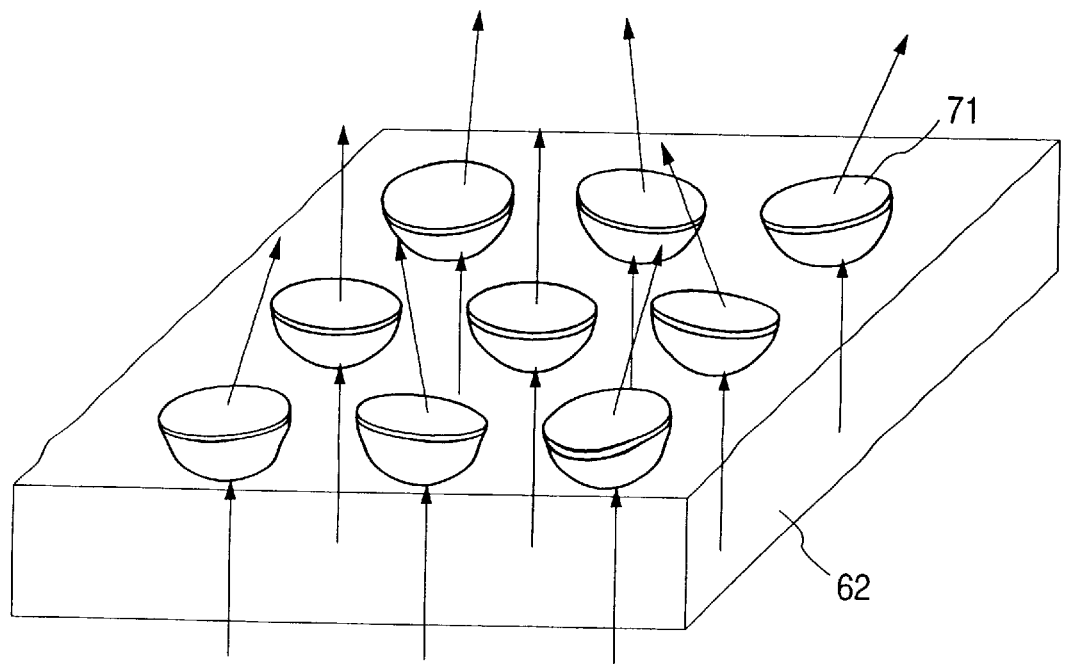

FIG. 7 and FIG. 8 show a fifth example of the present invention. In FIG. 7, the numeral 61 indicates a surface emitting laser prepared in a two-dimensional array in which the laser elements are arranged at intervals of 100 μm. The laser comprises, for example, multiple quantum wells having an active layer of GaAs/AlGaAs interposed between multi-layered reflection mirrors comprised of AlAs/AlGaAs. The oscillation wave length is 0.83 μm. Two-dimensional array is constituted of 8×8 elements, and the electrodes are led out from the respective elements for independent driving. In FIG. 7, the number of the array is reduced for simplicity of the explanation. The laser light output is, for example, about 5 mW for an input current of 15 mA. Light deflection device 62 is placed in close contact with the surface emitting laser array.

FIG. 8 shows arrayed light deflection device 62. As shown in FIG. 8, independently turn-controllable hemisphere bodies 71 are arranged in a two-dimensional array corresponding to surface emitting laser array 61. The array of deflection device 62 is comprised of the quartz devices of Example 2 or Example 3 to transmit light of 0.83 μm. In this Example, however, hemisphere body 71 is turned by control by three divisional electrodes arranged rotation-symmetrically at a rotation angle of 120°. Light detector array 63 is placed at the light emission side of light deflection device array 62. Light detector array 63 is placed with a gap of about 2 mm from light deflection device array 62 in consideration of light deflection from end to end between the two-dimensional arrays. The light detector is comprised, for example, of Si pin photodiodes.

The outgoing light beam from surface emitting laser array 61 is introduced to light deflection device 62. The light beam is refracted at the flat surface of the quartz hemisphere body and reaches a desired pixel on photodiode array 63. According to the above operation, reconfigurable interconnection can be realized by means of the light beam deflection in three dimensional free space.

EXAMPLE 6

Figure 9:
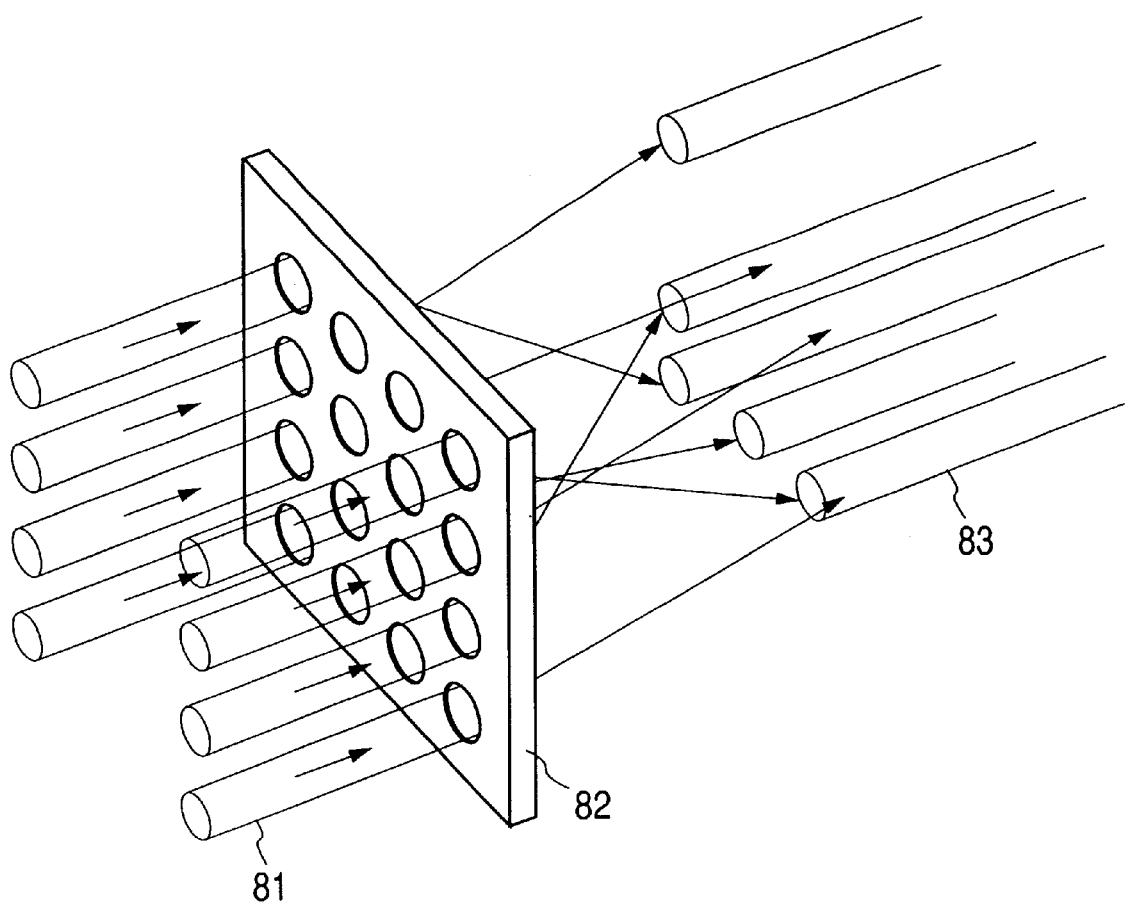
FIG. 9 is a perspective view of an array of the light deflection device in a sixth example of the present invention.

FIG. 9 shows a sixth example of the present invention. In FIG. 9, the numeral 81 indicates a two-dimensional fiber array of 4×4 fibers (shown partially), at intervals between fiber centers of 250 μm. In base plate 82 having therein hemisphere bodies of the light deflection device of the present invention, concaves for fitting fiber array 81 to facilitate registration of the fiber array 81. The light beams emitted from fiber array 81 having wavelength, for example, of 1.55 μm is deflected depending on the tilt of the flat portion of hemisphere body of the light deflection device. At the light output side, the deflected light beams are introduced into the fiber array 83 (shown partially) at the intended positions. With the above constitution, light beams of 16 channels are switched in parallel.

As described above, the light deflection device of the present invention deflects light in a mechanical manner, so that the light beam can be deflected at a large deflection angle in an arbitrarily direction in three dimensional space. Since the light introducing devices and the light receiving devices are arranged in the light transmission direction, the entire apparatus can be made more compact advantageously.

Furthermore, the light deflection device of the present invention drives the segmental sphere body in non-contact manner with relatively simple driving mechanism, which is suitable for arrangement in an array, and miniaturization of the apparatus. The light deflection device array of the present invention enables arbitrary switching of connection of signal transmission.

What is claimed is:

1. A light deflection device, comprising:
    a segmental sphere body having a flat face portion for transmitting an incident light beam by controlling a deflection angle, and a segmental sphere face portion opposing the flat face portion;
    a base plate for supporting the segmental sphere body in a turnable manner; and
    a driving means for turning the segmental sphere body by an electrostatic force, a refractive index of the segmental sphere body being different from a refractive index of a space or medium brought into contact with the flat face portion.

2. The light deflection device according to claim 1, wherein the base plate has a spherical concave shape corresponding to the shape of the segmental sphere body.

3. The light deflection device according to claim 2, wherein a gap is provided between the segmental sphere face portion of the segmental sphere body and the concave shape of the base plate, the gap being filled with a medium for reducing reflection of the light beam.

4. The light deflection device according to claim 3, wherein the medium is a lubricating agent.

5. The light deflection device according to claim 3, wherein an antireflection film for preventing reflection of the light beam is formed on the concave of the base plate and the segmental sphere face portion of the segmental sphere body respectively.

6. The light deflection device according to claim 1, wherein the segmental sphere face portion of the segmental sphere body is a hemispherical face.

7. The light deflection device according to claim 1, wherein an antireflection film for preventing reflection of the light beam is formed on the flat face portion.

8. The light deflection device according to claim 1, wherein the base plate supports the segmental sphere body such that the segmental sphere body is turnable within respective planes passing the spherical center of the segmental sphere body and are perpendicular to each other.

9. The light deflection device according to claim 1, wherein the driving means drives the segmental sphere body by an electrostatic force produced between a first electrode provided on the segmental sphere body and a second electrode provided at a position in opposition to the first electrode.

10. The light deflection device according to claim 1, wherein the driving means drives the segmental sphere body by an electrostatic force produced by charge distribution caused on the surface of the segmental sphere body.

11. A light deflection array, comprising the light deflection device of any of claims 1 to 10 arranged in a one-dimensional or two-dimensional array.

12. The light deflection device according to claim 2, wherein a shape of said concave corresponds to a shape of said segmental sphere face portion.

13. The light deflection device according to claim 2, wherein said concave has a hemisphere shape.

14. The light deflection device according to claim 2, wherein said concave is in a shape of a cone.

15. The light deflection device according to claim 2, wherein said concave is in a shape of a cylinder.

16. The light deflection device according to claim 1, wherein said flat face portion has a concave or convex shape.

17. The light deflection device according to claim 1, wherein a transparent electrode is formed on said flat face portion.

* * * * *